(12) United States Patent
Baligh

(10) Patent No.: US 9,819,526 B2
(45) Date of Patent: Nov. 14, 2017

(54) APPARATUS AND METHODS FOR LOW PAPR TRANSMISSION IN MIMO SYSTEMS

(71) Applicant: Huawei Technologies Co., Ltd., Shenzhen (CN)

(72) Inventor: Mohammadhadi Baligh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/933,171

(22) Filed: Nov. 5, 2015

(65) Prior Publication Data

US 2017/0134202 A1    May 11, 2017

(51) Int. Cl.
*H04B 7/02* (2017.01)
*H04L 27/26* (2006.01)
*H04B 7/0456* (2017.01)

(52) U.S. Cl.
CPC ....... *H04L 27/2614* (2013.01); *H04B 7/0456* (2013.01)

(58) Field of Classification Search
CPC ....... H04L 27/2623; H04L 2025/03426; H04L 25/03343; H04L 2025/03414; H04L 27/2628; H04L 27/265; H04L 5/0007; H04B 7/0426; H04B 7/0452; H04B 7/024; H04B 7/0456; H04J 13/004; H04J 13/12
See application file for complete search history.

(56) References Cited

U.S. PATENT DOCUMENTS

| | | | | |
|---|---|---|---|---|
| 2009/0060070 A1* | 3/2009 | Hayase | ............ | H04L 5/006 |
| | | | | 375/260 |
| 2009/0129257 A1* | 5/2009 | Maltsev | ............ | H03F 1/0205 |
| | | | | 370/208 |
| 2009/0154335 A1* | 6/2009 | Lee | ............ | H04L 25/03 |
| | | | | 370/203 |

(Continued)

FOREIGN PATENT DOCUMENTS

| | | |
|---|---|---|
| CN | 1914871 A | 2/2007 |
| CN | 101103570 A | 1/2008 |

(Continued)

OTHER PUBLICATIONS

Rahmatallah, et al., "Peak-To-Average Power Ratio Reduction in OFDM Systems: A Survey and Taxonomy," IEEE Communications Surveys & Tutorials, vol. 15, No. 4, Fourth Quarter 2013, pp. 1567-1592.

(Continued)

*Primary Examiner* — Khanh C Tran
(74) *Attorney, Agent, or Firm* — Slater Matsil, LLP

(57) ABSTRACT

System and method embodiments are provided herein for achieving low peak-to-average power ratio (PAPR) signals in multiple-input and multiple-output (MIMO) systems, including Massive MIMO (M-MIMO) systems. The embodiments include two schemes to reduce the PAPR in the transmitted signals. In a first scheme, the signals are precoded, at a BS or UE, to offload a signal from one antenna to another antenna to achieve PAPR reduction. The precoding is done with some penalty in terms of signal gain. In a second scheme, the signal is clipped and the clipped portion is further projected on the MIMO antennas to compensate for the error caused by clipping. Out-of-band radiation is also removed in this scheme.

36 Claims, 9 Drawing Sheets

(56) References Cited

U.S. PATENT DOCUMENTS

| | | | |
|---|---|---|---|
| 2009/0190685 A1 | 7/2009 | Kimura | |
| 2009/0316813 A1* | 12/2009 | Kawasaki | H04L 1/0625 375/260 |
| 2014/0348254 A1* | 11/2014 | Lee | H04B 7/0426 375/267 |
| 2015/0222299 A1* | 8/2015 | Janani | H04B 1/0475 375/297 |
| 2016/0087829 A1* | 3/2016 | Jia | H04B 7/0452 375/267 |

FOREIGN PATENT DOCUMENTS

| | | |
|---|---|---|
| CN | 103036835 A | 4/2013 |
| CN | 103098403 | 5/2013 |

OTHER PUBLICATIONS

Mohammed, et al., "Constant-Envelope Multi-User Precoding for Frequency-Selective Massive MIMO Systems," IEEE Wireless Communications Letters, vol. 2, No. 5, Oct. 2013, pp. 547-550.

Studer, et al., "PAR-Aware Large-Scale Multi-User MIMO-OFDM Downlink," IEEE Journal on Selected Areas in Communications, Sep. 4, 2012, 11 pages.

* cited by examiner

APPARATUS AND METHODS FOR LOW PAPR TRANSMISSION IN MIMO SYSTEMS

TECHNICAL FIELD

The present invention relates to wireless communications, and, in particular embodiments, to apparatus and methods for low peak-to-average power ratio (PAPR) Transmission in multiple-input and multiple-output (MIMO) systems.

BACKGROUND

In MIMO systems, the capacity of a radio link is multiplied or increased using multiple transmit and receive antennas to exploit multipath propagation in various orientations or directions. A base station or user equipment (UE) can send and/or receive more than one data signal on the same radio channel at the same time using multipath propagation. Massive MIMO (M-MIMO) is an advanced MIMO technique that can be used in current and next generation wireless communication systems. In M-MIMO, a set of antennas is used with corresponding radio frequency (RF) amplifiers to increase gain in transmitted signal power. Each M-MIMO antenna or a group of antennas is driven by a RF amplifier. With the availability of many antennas at the network node, narrow oriented beams (e.g., razor-thin beams) are possible in both uplink and downlink. Such narrow beams improve the coverage of the network by outreaching to users at distance, or improve the network capacity by allowing transmission to several users (referred to as multi-user MIMO). Using such narrow beams also reduces the overall inter-cell interference. However, due to the utilization of MU-MIMO especially at the presence of multi-carrier modulation schemes such as OFDM, the M-MIMO scheme suffers from high peak-to-average power ratio (PAPR) in transmitted signals, which is undesirable and causes challenges in designing the radio equipment. A scheme that reduces or limits PAPR in MIMO and M-MIMO communications is needed.

SUMMARY OF THE INVENTION

In accordance with an embodiment, a method performed by a network entity for configuring transmission in a multiple-input and multiple-output (MIMO) system is disclosed. The method includes obtaining a signal to be transmitted by a first set of antennas of the network entity, and determining a penalty to add cost for one or more portions of the signal that are projected on one or more of the antennas in the first set with higher peak-to-average power ratio (PAPR) than remaining portions of the signal. The method further includes obtaining a penalized signal to be transmitted by a second set of antennas in accordance with the penalty. The penalized signal has a smaller PAPR than the obtained signal.

In accordance with another embodiment, a network component supporting transmission in a MIMO system is disclosed. The network component comprises at least one processor coupled to a memory, and a non-transitory computer readable storage medium storing programming for execution by the at least one processor. The programming including instructions to obtain a signal to be transmitted by a first set of antennas of the network component, and determine a penalty to add cost for one or more portions of the signal that are projected on one or more of the antennas in the first set with higher PAPR than remaining portions of the signal. The instructions also configured the network component to obtain a penalized signal to be transmitted by a second set of antennas in accordance with the penalty. The penalized signal has a smaller PAPR than the obtained signal.

In accordance with another embodiment, a method performed by a network entity for configuring transmission in a MIMO is disclosed. The method includes determining a time domain penalty for a time domain signal to be transmitted by a first set of antennas of the network entity. The time domain penalty determined to add cost to one or more portions of the time domain signal that are projected on one or more of the antennas in the first set with higher PAPR than remaining portions of the time domain signal. The method further includes translating the time domain penalty into a frequency domain penalty, and obtaining a penalized frequency domain signal to be transmitted by a second set of antennas in accordance with the frequency domain penalty. The penalized frequency domain signal has a smaller peak-to-average power ratio (PAPR) than the time domain signal.

In accordance with another embodiment, a network component supporting transmission in a MIMO system is disclosed. The network component comprises at least one processor coupled to a memory, and a non-transitory computer readable storage medium storing programming for execution by the at least one processor. The programming includes instructions to determine a time domain penalty for a time domain signal to be transmitted by a first set of antennas of the network component. The time domain penalty is determined to add cost to one or more portions of the time domain signal projected on one or more of the antennas in the first set with higher PAPR than remaining portions of the time domain signal. The programming includes further instructions to translate the time domain penalty into a frequency domain penalty, and obtain a penalized frequency domain signal to be transmitted by a second set of antennas in accordance with the frequency domain penalty. The penalized frequency domain signal has a smaller PAPR than the time domain signal.

In accordance with an embodiment, a method performed by a network entity for configuring transmission in a MIMO system is disclosed. The method includes clipping a time domain signal to a determined saturated level, wherein the clipped time domain signal has a smaller PAPR than the time domain signal, and projecting, using MIMO precoding, the adjustment signal for the clipped time domain signal on a plurality of antennas for transmission. The adjustment signal is obtained in accordance with a constellation deviation due to distortion in the clipped time domain signal.

In accordance with yet another embodiment, a network component supporting transmission in a MIMO system is disclosed. The network component comprises at least one processor coupled to a memory, and a non-transitory computer readable storage medium storing programming for execution by the at least one processor. The programming includes instructions to clip a time domain signal to a determined saturated level. The clipped time domain signal has a smaller PAPR than the time domain signal, and project, using MIMO precoding, an adjustment signal for the clipped time domain signal on a plurality of antennas for transmission. The adjustment signal is obtained in accordance with a constellation deviation due to distortion in the clipped time domain signal.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
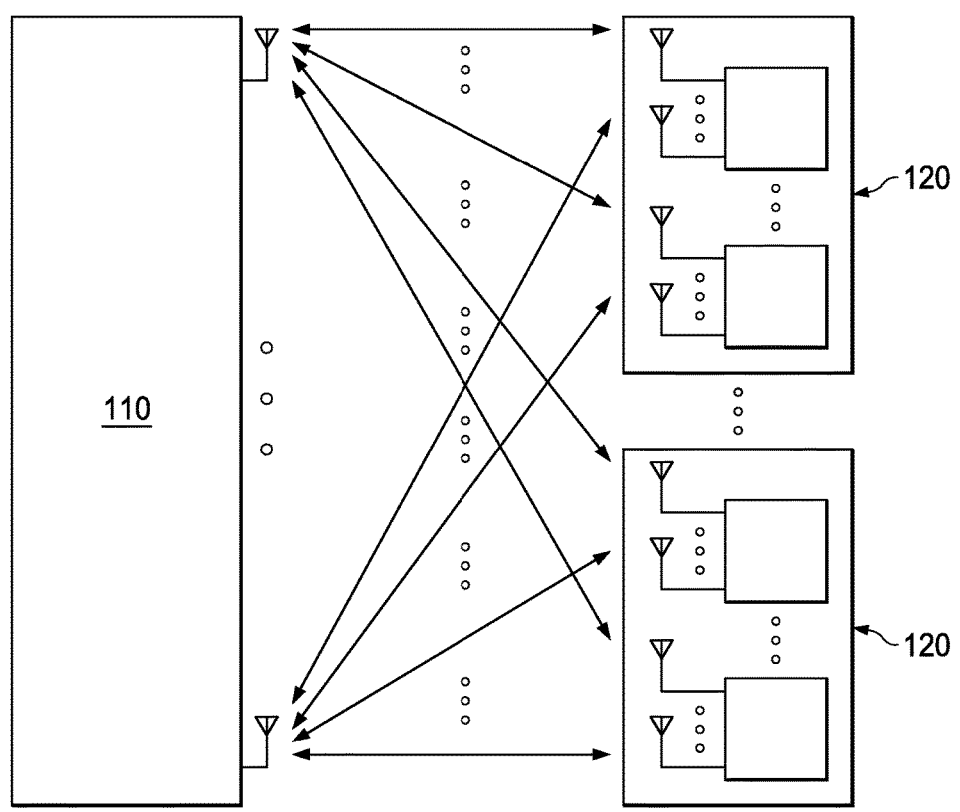
FIG. 1 illustrates a MIMO communications system.

FIG. 1 shows a MIMO communications system including a radio access network (RAN) node 110 and one or more UEs 120. The RAN node 110 is also referred to in scenarios as a base station (BS) or a transmission point (TP). Although one RAN node 110 is shown, the system may include any number of RAN nodes 110. Examples of the RAN node 110 include a nodeB, an evolved nodeB (eNB), a WiFi TP, or any other type of network node capable of exchanging wireless signals with the UE 120. Examples of the UE 120 include a smartphone, a mobile phone, a laptop computer, a tablet computer, a sensor device, or any other suitable device capable of exchanging wireless signals with the RAN node 110. According to the MIMO transmission scheme, both the RAN node 110 and the UE 120 can each communicate on multiple paths using multiple antennas. The MIMO and multiple antennas allow the RAN node 110 to communicate, e.g., simultaneously, with multiple UEs 120. A UE 120 can also communicate, e.g., simultaneously, with multiple RAN nodes 110.

In addition to multiple antennas, the RAN node 110 and the UE 120, each comprises a processor for precoding the signals prior to transmission. The precoding process determines signal parameters (e.g., amplitudes, phases, orientation angles) to direct multiple signal beams for transmission by the antennas. This process is also referred to as beamforming. The multiple beams are sent on multiple paths between the antennas of the transmitting device and the receiving device. As such, multiple signals can be transmitted simultaneously over the multiple paths. A signal can also be split into multiple component signals to be sent by multiple antennas. For example, a high-rate signal can be split into lower-rate signals transmitted by the multiple antennas. At the receiver side, the lower-rate signals are received by multiple antennas and then combined to obtain the original signal.

Each of the multiple antennas at the RAN node no and the UE 120 may be equipped with a corresponding RF amplifier, which can increase signal gain and hence mitigate interference between signals. This is referred to as a M-MIMO system. However, amplifying the individual signal beams by individual RF amplifiers can also increase the PAPR, which could affect the detection of the received signals at the receiver side. Reducing the PAPR can improve detection and hence the quality of MIMO communications. System and method embodiments are provided herein for achieving low PAPR signals in MIMO systems including M-MIMO. The embodiments include two schemes to reduce the PAPR in the transmitted signals. In a first scheme, the signals are precoded, at the BS or UE, to offload one or more signal portions from one or more antennas to one or more other antennas to achieve PAPR reduction. In an embodiment, a signal portion can be moved for transmission from one antenna in the considered set of antennas to another antenna in the set. In another embodiment, a portion can be moved to an antenna that is not originally considered and is not part of the original considered set. The precoding is done with some penalty in terms of signal gain. This scheme is referred to herein as penalty based precoding. In a second scheme, the signal is clipped and the clipped portion is further projected on one or more antennas, in the original considered set or otherwise, to compensate for the error caused by clipping. Out-of-band radiation is also removed in the signal clipping and projection scheme. Both schemes can be used to reduce PAPR in M-MIMO or any applicable MIMO system.

In the penalty based precoding scheme to reduce signal PAPR, the MIMO system is modeled considering a plurality of M transmit antennas at the transmitter (M is an integer). The transmitter serves a plurality of K users, each having one or more receive antenna (K is an integer). In the following, the case of one receive antenna is studied. The concept can be extended to multiple receive antennas in a straight forward manner. The channel to user k is represented by the value $h_k$, and the overall channel from the transmitter to all users is represented by:

$$H = \begin{bmatrix} h_1 \\ h_2 \\ \vdots \\ h_k \end{bmatrix}.$$

The expected received signal at user k and at a frequency f (or time t for single carrier) is represented by the value $y_k$, and the overall received vector from all users is represented by:

$$Y = \begin{bmatrix} y_1 \\ y_2 \\ \vdots \\ y_k \end{bmatrix}.$$

The transmitted signal at the frequency f is a vector of size M, and is represented by a vector X. In the time domain, the transmitted signal is referred to as x. The overall matrix of the transmitted signal in the time domain can be represented by a matrix $X=[X_0 \ldots X_{N-1}]$ of size M×N, where N is the number of tones in the frequency domain. The time signal is sampled at time interval $\Delta t$ with n time domain signal samples (i.e., $$\Delta t = \frac{T}{n} \text{ where } T = \frac{1}{\Delta f}$$

is the OFDM signal length), and can be represented as x=XF. The matrix F is the Fourier transfer matrix of size N×n and its values are obtained as:

$$F_{ij} = \frac{1}{\sqrt{N}} e^{2\pi \Delta f i \Delta t j} = \frac{1}{\sqrt{N}} e^{\frac{2\pi i j}{n}}, i = 0, \ldots, N-1, j = 0, \ldots, n-1$$

For single carrier transmission, F is the interpolation matrix for pulse shaping.

The unused degrees of freedom for transmitting the signals using the available antennas in the transmitter can be used directly or indirectly to reduce the PAPR. With multiple available antennas at the transmitter side, a M-MIMO system can benefit from unused spatial dimensions to achieve PAPR reduction. For instance, the PAPR reduction in M-MIMO orthogonal frequency-division multiplexing (OFDM) can be modeled as $X_{lowPAPR}=\arg\min_x \|x\|_\infty$ such that x=XF, and $H_t X_t = Y_t$ for all considered tones t=0, . . . , N−1. Zero forcing (ZF) is a precoding algorithm that considers all the available dimensions (degrees of freedom) of the transmit antenna equally. ZF can be achieved as $X_{ZF}=\arg\min_x \|x\|_2$ with the same subject criteria. Therefore, any low PAPR algorithm (or any algorithm) with zero leakage has higher total transmit power than ZF, as norm-2 squared represents the transmitted power. The above optimization algorithm for PAPR reduction may be complex for both single carrier and OFDM cases. However, the degrees of freedom in the subject criteria is determined by the difference in the number of antennas at the transmitter and the number of served users, which in the case of M-MIMO for example can be substantially high. This high degree of freedom can be used for effectively reducing the PAPR.

In the case of single carrier, a penalty based algorithm is used to reduce the PAPR. The penalty based precoding applies a penalty on the antennas with higher PAPR to move the signal to the other antennas. If F is the identity matrix where the PAPR is considered only at the sampling times, then the time domain signal is the same as X. First, the ZF signal X is found for each sampling point, where $X=H\dagger Y$.

The penalty is then calculated as $P=\text{diag}(|X|^\alpha)$, where $\alpha$ is the penalty exponent. The penalized ZF signal is then obtained as $X=P^{-1}H^H(HP^{-1}H^H)^{-1}Y$. The parameter $\alpha$ needs to be optimized for best result. Effectively, with such a penalty, the 2+$\alpha$ norm of the signal is minimized. For example, simulation results show a suitable value for $\alpha$ is 0.9 or 1. Other penalty functions can be used to achieve similar goals.

Figure 2:
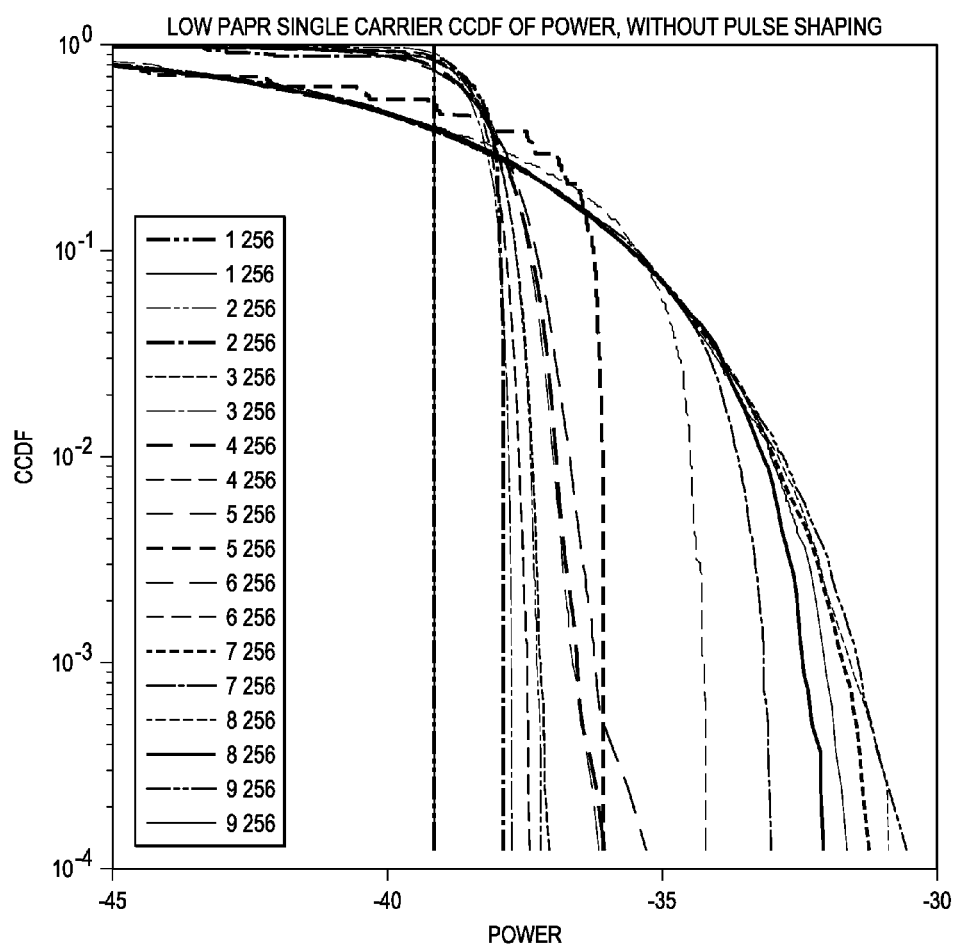
FIG. 2 shows an example of PAPR performance using penalty based precoding for single carrier transmission according to an embodiment.

FIG. 2 shows the PAPR performance of the penalty based precoding above for single carrier transmission on an Additive white Gaussian noise (AWGN) channel, for 1 to 9 users. The performance is evaluated by observing the complementary cumulative distribution function (CCDF) of the transmitted signal power. The CCDF is calculated over a power range in dB for each number of users with and without the penalty based algorithm described above for single carrier. The curves with solid lines correspond to the original signals and the curves with dashed lines correspond to the corresponding penalty based precoded signals. For the considered sampling points (256 points), the algorithm shows significant reduction in the PAPR in comparison to the original signals. The reduction in CCDF is observed for all cases with different number of users.

Figure 3:
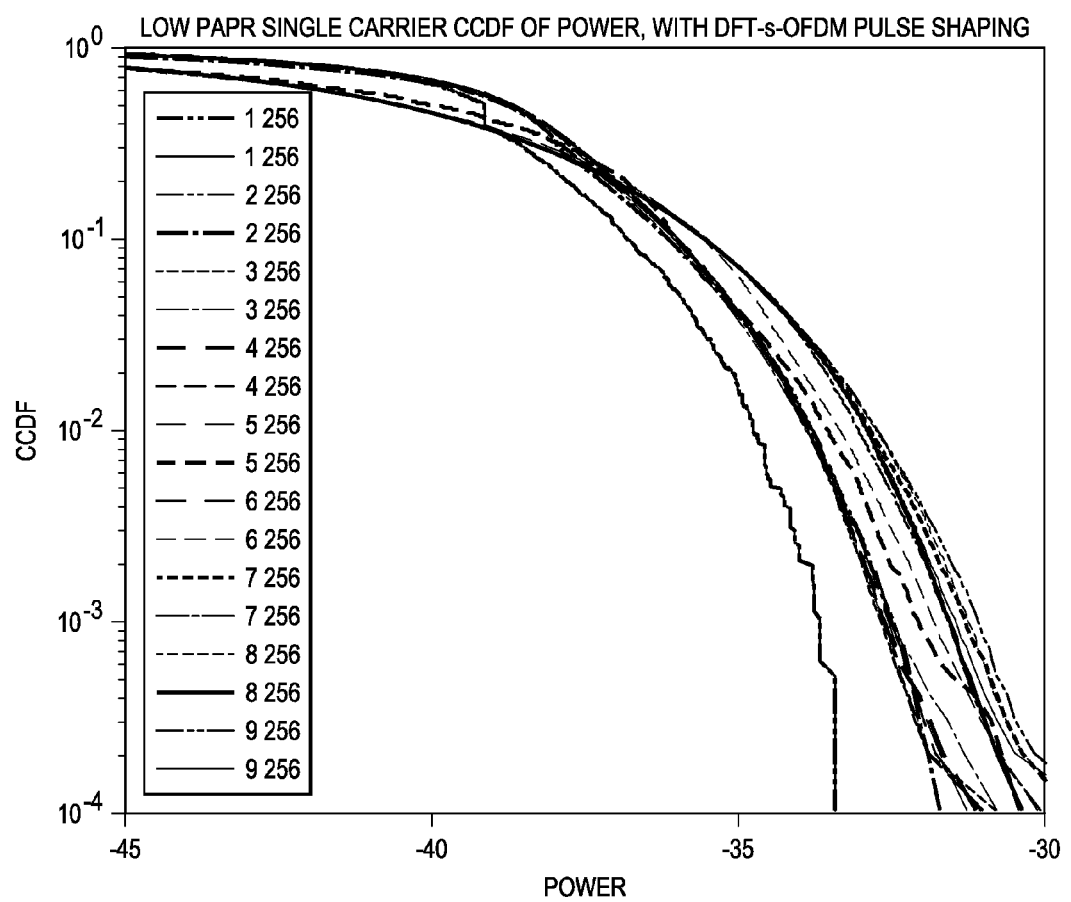
FIG. 3 shows an example of PAPR performance using penalty based precoding for single carrier transmission with pulse shaping according to an embodiment.

In an embodiment, an interpolation algorithm is further used to improve the PAPR for points other than the sampling points. FIG. 3 shows the PAPR performance of penalty based precoding for single carrier transmission with interpolation using discrete Fourier transform (DFT) based OFDM pulse shaping. The results show PAPR reduction in penalty based precoded signals with pulse shaping (curves with dashed lines) in comparison to the corresponding original signals without PAPR reduction (curves with solid lines). The penalty based PAPR reduction also causes a power boost in the transmitted signal. Table 1 shows the power boost resulting from this algorithm in the case of 2 to 9 users.

TABLE 1

| No. of users | Power boost (dB) |
|---|---|
| 2 | 0.44 |
| 3 | 0.59 |
| 4 | 0.61 |
| 5 | 0.64 |
| 6 | 0.65 |
| 7 | 0.66 |
| 8 | 0.66 |
| 9 | 0.66 |

In the case of OFDM transmission, the time domain signal depends on the elements of Y in frequency domain samples. While PAPR reduction is implemented in the time domain, ZF is implemented in the frequency domain, and hence the penalty in the time domain due to PAPR reduction needs to be translated to the frequency domain. In the penalty based PAPR reduction algorithm for OFDM, the signal time domain is normalized to its average amplitude. The time domain penalty is obtained as $P_t=(\max(|x|-1,0))^\alpha \exp(j\angle\phi(x))$, where $\phi(.)$ is the phase of the signal. The frequency domain penalty is obtained as:

$$P_f = \text{real}\left\{\sum P_t \exp\left(-\frac{j2\pi f t}{N_{OFDM}}\right)\exp(-jL\varphi(X))\right\}.$$

The value $P_f$ is then normalized to its mean value. The penalty to the frequency domain signal is then applied as $C+P_f$ (C is a constant) as:

$$P = diag\left(C + \frac{P_f}{\overline{P_f}}\right)$$

$$X = P^{-1}H^H(HP^{-1}H^H)^{-1}Y.$$

The parameter values $\alpha$ and C can be optimized based on trial and error. For example, simulation results show suitable values for the case of 5 co-paired users are 1.5 for $\alpha$ and 1.7 for C. Other penalty functions and translations methods from time to frequency domain can be used to achieve a similar goal. This algorithm is applicable for multiple carrier transmission, and allows no out-of-band radiation. A boost in power is also provided in addition to PAPR reduction.

The PAPR in the signal can also be reduced by clipping and then filtering the time domain signal. However, this causes deviation in the constellation of the signal as received. The constellation is a representation of the signal modulated by a digital modulation scheme such as quadrature amplitude modulation or phase-shift keying. The constellation represents the signal as a two-dimensional scatter diagram in the complex plane at symbol sampling instants. Thus, a deviation in the constellation translates into error upon detection of the received signal. The clipping also causes out-of-band radiation. Further filtering the signal to cancel the out-of-band radiation causes a rise again in the PAPR, although to a less extent than the original PAPR level. The filtering also causes reduction in total power. Further boosting the signal and clipping until a certain level of PAPR is achieved causes further constellation deviation which affects signal detection. The clipping and filtering does not utilize the unused dimensions in the massive MIMO and does not offload a portion of the signal to other antennas.

In an embodiment, a clipping and projection scheme is used to reduce signal PAPR with better results than the clipping and filtering approach. The signal is clipped and the clipped portion is further projected by precoding. The projection can be done by equally considering all degrees of freedom (or spatial dimensions) of the MIMO or M-MIMO antennas. Alternatively, the projection can be done using the penalty based approach described above, which offloads the clipped portion to the unused spatial dimensions, resulting in the transmission of the entire original signal. The clipped portion can be offloaded to other antennas in the original considered set of antennas (e.g., all the antennas at the transmitter) or to antennas of the transmitter that are not included in the original set of antennas considered before clipping. A clipped version of the time domain $x_c$ is derived by clipping x in the time domain to a saturated level (A), as:

$$x_c = min(|x|,A)exp(j\angle x)$$

The clipping may cause out-of-band radiation and signal distortion. The signal distortion can be determined by:

$$Y_{dist} = HX_{dist}$$

Out of band radiation can be evaluated as $X_{OOB} = F_c^H x_c$ where $F_c$ is the omitted rows of F from a full DFT matrix. The constellation deviation is calculated as $Y_{dev} = Y - Y_{dist}$. The portion of the deviation to be adjusted is found by $Y_{adj} = max(|Y_{dev}| - B, 0)exp(j\angle Y_{dev})$. The adjustment signal $X_{adj}$ is protected back to ensure that $HX_{adj} = Y_{adj}$.

Different solutions are possible to project the adjustment signal $X_{adj}$. In an embodiment, the equation ZF: $X_{adj_{ZF}} = H^\dagger Y_{adj}$ is solved to project the clipped portion onto all the degrees of freedom of the MIMO system. In another embodiment, an alternative penalty based approach is used for projecting the adjustment signal. Each value x is first normalized to its average amplitude to get an average amplitude of 1. The time domain penalty is then obtained as $P_t = max(|x|-1,0)^\alpha exp(j\angle\phi(x))$. The frequency domain penalty is further obtained based on the time domain penalty and the adjustment signal projected by zero forcing, as:

$$P_f = real\left\{\sum_{t=1}^{n} P_t exp\left(-\frac{j2\pi f t}{N_{OFDM}}\right)exp(-j\angle\varphi(X_{adj_{ZF}}))\right\}.$$

The value $P_f$ is then normalized to its mean value. The penalty to the frequency domain signal is then applied as:

$$P = diag\left(C + \frac{P_f}{\overline{P_f}}\right)$$

$$X_{adj_{Pen}} = P^{-1}H^H(HP^{-1}H^H)^{-1}Y_{adj}.$$

The values of the penalty exponent, $\alpha$, and the optimization constant, C, can be optimized based on trial and error. For example, simulation results show suitable values for the case of 5 co-paired users are 7.5 for $\alpha$ and 1.7 for C. The solutions above for projecting the adjustment signal can be implemented in an iterative manner by repeating the solution steps. After each iteration, the transmit power may be reduced. Therefore, the signal may then be boosted to its original value, in each iteration.

Figure 4:
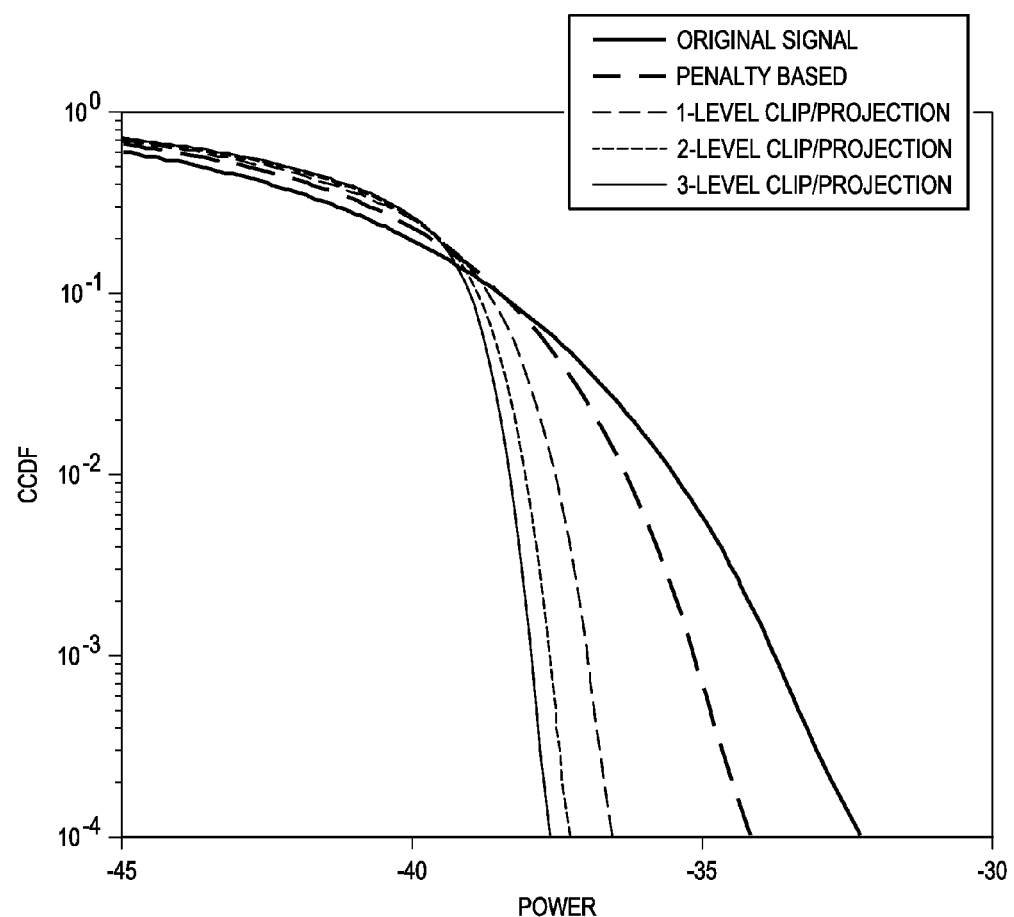
FIGS. 4-6 show examples of PAPR performance using clipping and projection with penalty based precoding for OFDM transmission according to an embodiment.
Figure 5:
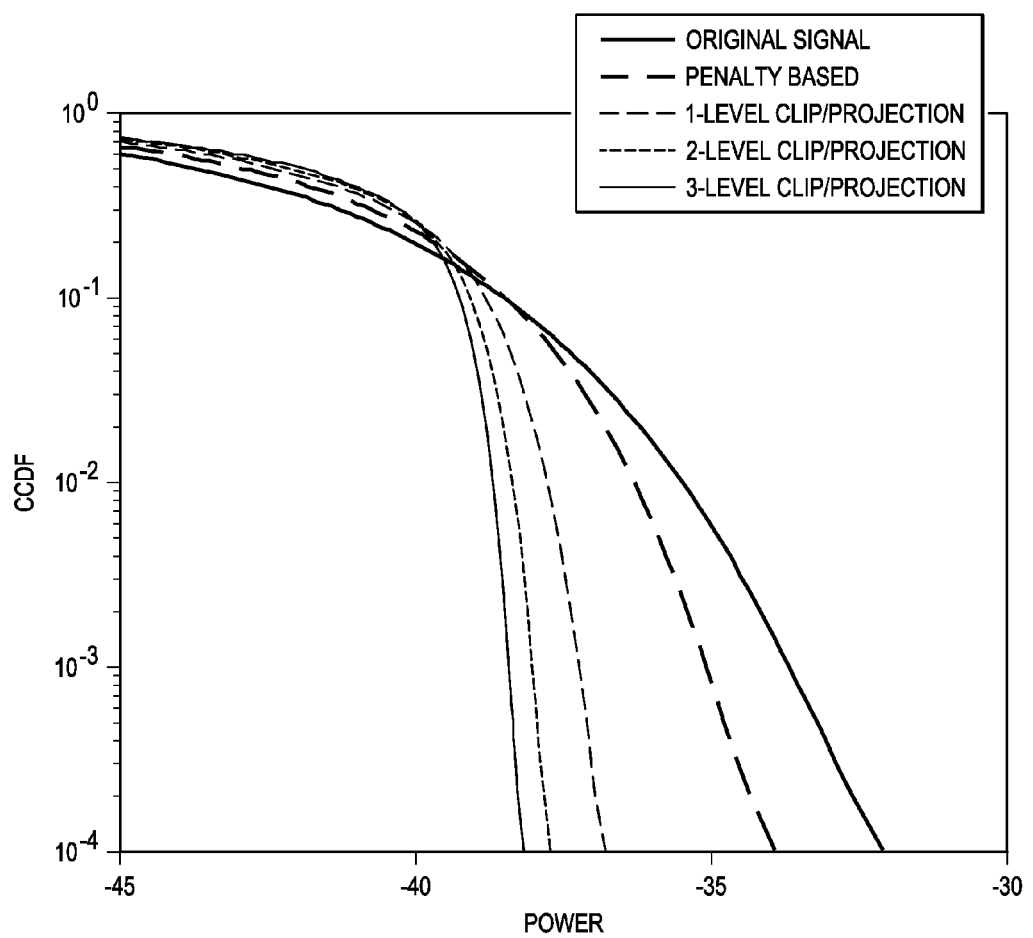
Figure 6:
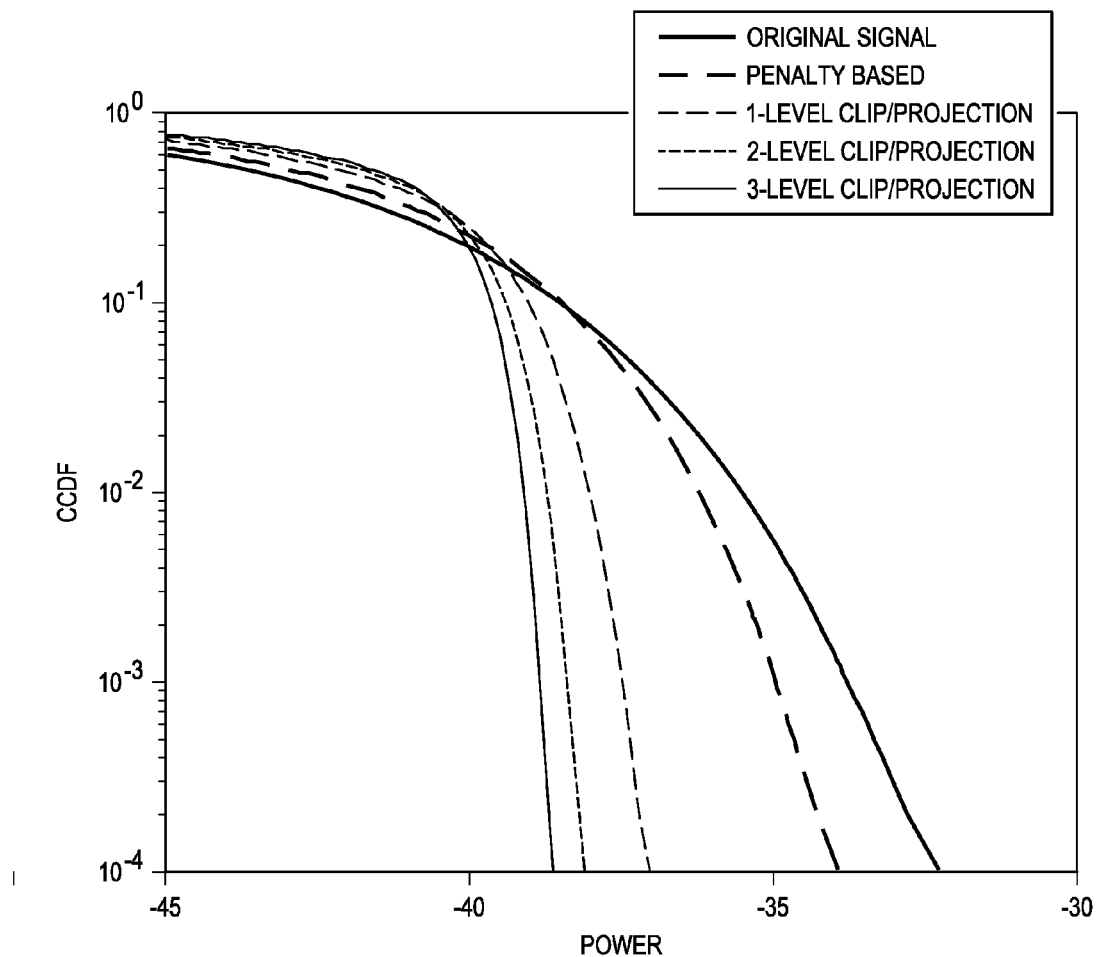

FIGS. 4 to 6 show examples of PAPR performance using clipping and projection with penalty based precoding for OFDM transmission according to simulation results. Specifically, FIGS. 4, 5 and 6 show results with −20 dB error tolerance, −15 dB error tolerance, and −10 dB error tolerance, respectively. Each figure shows the CCDF over a range of power in transmission for five cases. The cases examined include the original signal for OFDM, the signal precoded with the penalty based approach for OFDM (multi-carrier), and the signal clipped and then projected with further penalty based precoding at each of three levels. In a first clipping level, the signal is clipped and projected in one iteration. In the second and third clipping levels, the signal is clipped and projected in two and three iterations, respectively. As shown, using clipping and projection with penalty based precoding further reduces the PAPR in comparison to the penalty based approach without clipping. Increasing the levels or iterations of the clipping and projection steps also further reduces the PAPR.

Figure 7:
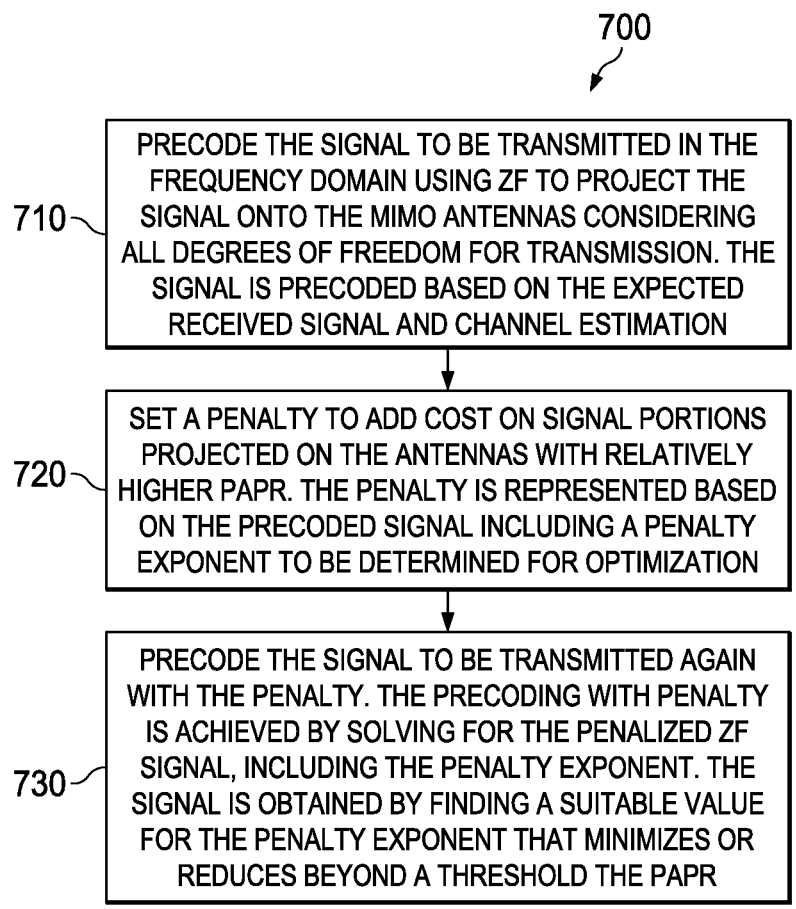
FIG. 7 shows an embodiment method for PAPR reduction using a penalty based approach for single carrier transmission.

FIG. 7 shows an embodiment method 700 for PAPR reduction using a penalty based approach for single carrier transmission. The method 700 can be performed, e.g., as part of a precoding process for the signal, by a processor at a RAN node or a UE in a MIMO or M-MIMO system. At step 710, the signal to be transmitted is precoded, X, in the frequency domain using ZF to project the signal onto the MIMO antennas considering all degrees of freedom for transmission. The signal is projected on a set of selected antennas. This can be realized mathematically by solving for $X_{ZF} = arg\ min_x \|x\|_2$. The signal can be precoded based on the expected received signal, Y, and channel estimation, H. The ZF can be found for each sampling point of the signal, where $X = H^\dagger Y$. Interpolation and pulse shaping can also be added to this step. At step 720, a penalty is set to add cost on signal portions projected on the antennas with relatively higher PAPR. The penalty, P, can be represented based on the precoded signal, such as $P=\text{diag}(|X|^\alpha)$, where $\alpha$ is a penalty exponent to be determined for optimization. At step 730, the signal to be transmitted is precoded again with the penalty. The precoding with penalty can be achieved by solving for the penalized ZF signal $X=P^{-1}H^H(HP^{-1}H^H)^{-1}Y$. The signal is obtained by finding a suitable value for the penalty exponent, $\alpha$, that minimizes or reduces beyond a threshold the PAPR. This causes offloading the signal portion with higher PAPR to other spatial dimensions that may not have been used in signal offloading in the initial ZF precoding. In an embodiment, the penalized signal to be transmitted is projected on the original set of selected antennas, where the one or more portions with higher PAPR are moved to other antennas in the set. Alternatively, in another embodiment, the one or more portions are offloaded to one or more antennas of the transmitter that are not in the original set of selected antennas.

Figure 8:
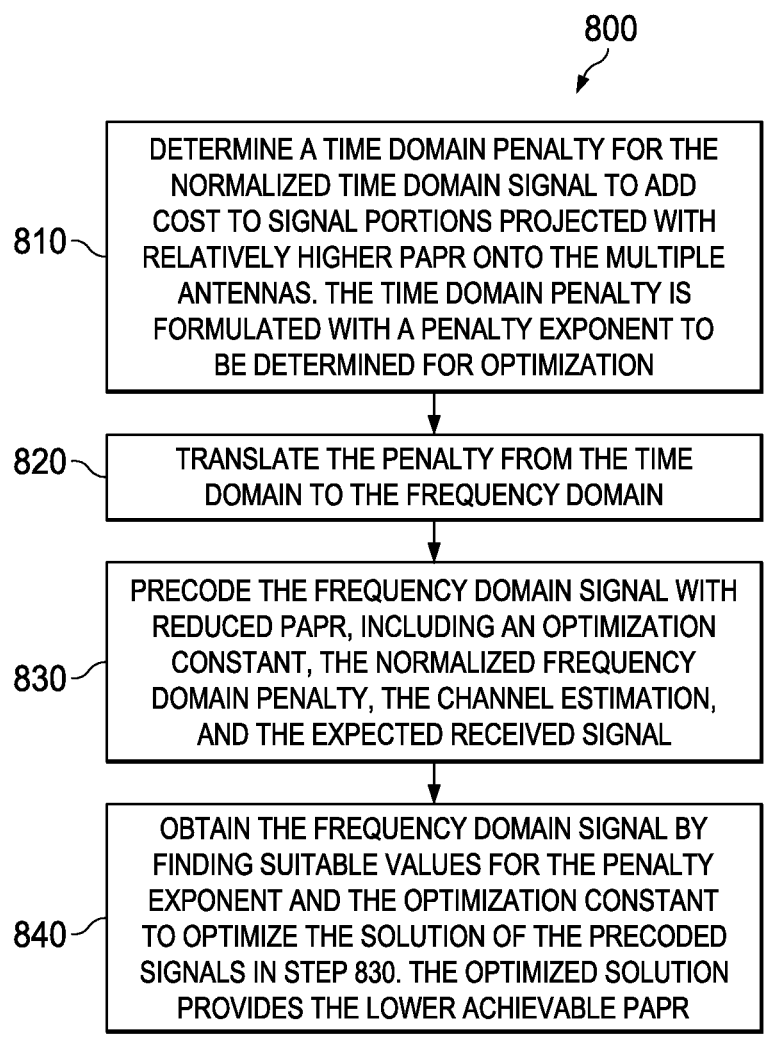
FIG. 8 shows an embodiment method for PAPR reduction using a penalty based approach for multiple carrier transmission with OFDM.

FIG. 8 shows an embodiment method 800 for PAPR reduction using a penalty based approach for OFDM transmission on multiple carriers. The method 800 can be performed by a processor at a RAN node or a UE in a MIMO or M-MIMO system, e.g., as part of a precoding process for the signal. At step 810, a time domain penalty is determined (or formulated) for the normalized time domain signal to add cost to signal portions projected with relatively higher PAPR onto a set of selected antennas. The time domain penalty, $P_t$, is formulated with a penalty exponent, $\alpha$, to be determined for optimization. The time domain penalty can be set as $P_t=(\max(|x|-1,0))^\alpha \exp(j\angle\phi(x))$. At step 820, the penalty is translated from the time domain to the frequency domain. The relation between the frequency domain penalty and the time domain signal can be established as $P_t=(\max(|x|-1,0))^\alpha \exp(j\angle\phi(x))$. At step 830, the frequency domain signal with reduced PAPR is precoded including an optimization constant, C, the normalized frequency domain penalty, the channel estimation H, and the expected received signal Y. The reduced PAPR signal is set to $X=P^{-1}H^H(HP^{-1}H^H)^{-1}Y$, where $$P = \text{diag}\left(C + \frac{P_f}{\overline{P}_f}\right).$$

At step 840, the frequency domain signal is obtained by finding suitable values for the penalty exponent and the optimization constant to optimize the solution of the precoded signal in step 830. The optimized solution provides a lower achievable PAPR. The frequency domain signal with reduced PAPR is projected on the original set of selected antennas, where the one or more portions with higher PAPR are moved to other antennas in the set. Alternatively, the one or more portions are offloaded to one or more antennas of the transmitter that are not in the original set of selected antennas.

Figure 9:
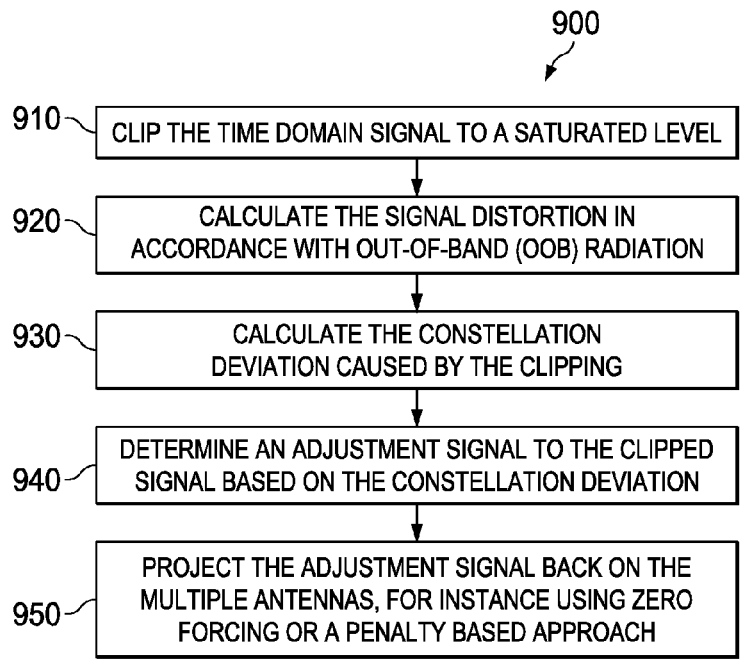
FIG. 9 shows an embodiment method for PAPR reduction using clipping and projection for OFDM transmission.

FIG. 9 shows another embodiment method 900 for PAPR reduction using clipping and projection for OFDM transmission. The method 900 can be performed by a processor at a RAN node or a UE in a MIMO or M-MIMO system, e.g., as part of a precoding process for the signal. At step 910, the time domain signal is clipped to a saturated level, A. The clipped time domain signal can be set as $x_c=\min(|x|,A)\exp(j\angle x)$. The clipping can cause out-of-band radiation, signal distortion and constellation deviation. At step 920, the signal distortion is calculated as $X_{dist}=F_c^H x_c$, $X_{dist}$, where $F_c^H$ is the omitted rows of F from a full DFT matrix. The matrix $F_c$ can be evaluated in accordance with out-of-band (OOB) radiation as $X_{OOB}=F_c^H x_c$. At step 930, the constellation deviation according to signal distortion by the clipping is calculated. The constellation deviation can be obtained as $Y_{dev}=Y-Y_{dist}$. At step 940, an adjustment signal to the clipped signal is determined based on the constellation deviation. The signal adjustment, $Y_{adj}$, can be achieved by $Y_{adj}=\max(|Y_{dev}|-B, 0)\exp(j\angle Y_{dev})$. At step 950, the adjustment signal is projected back on the multiple antennas for transmission. The adjustment signal, $X_{adj}$, can be projected as $HX_{adj}=Y_{adj}$. For instance, the adjustment signal can be projected by zero forcing or using a penalty based approach, as described above.

Figure 10:
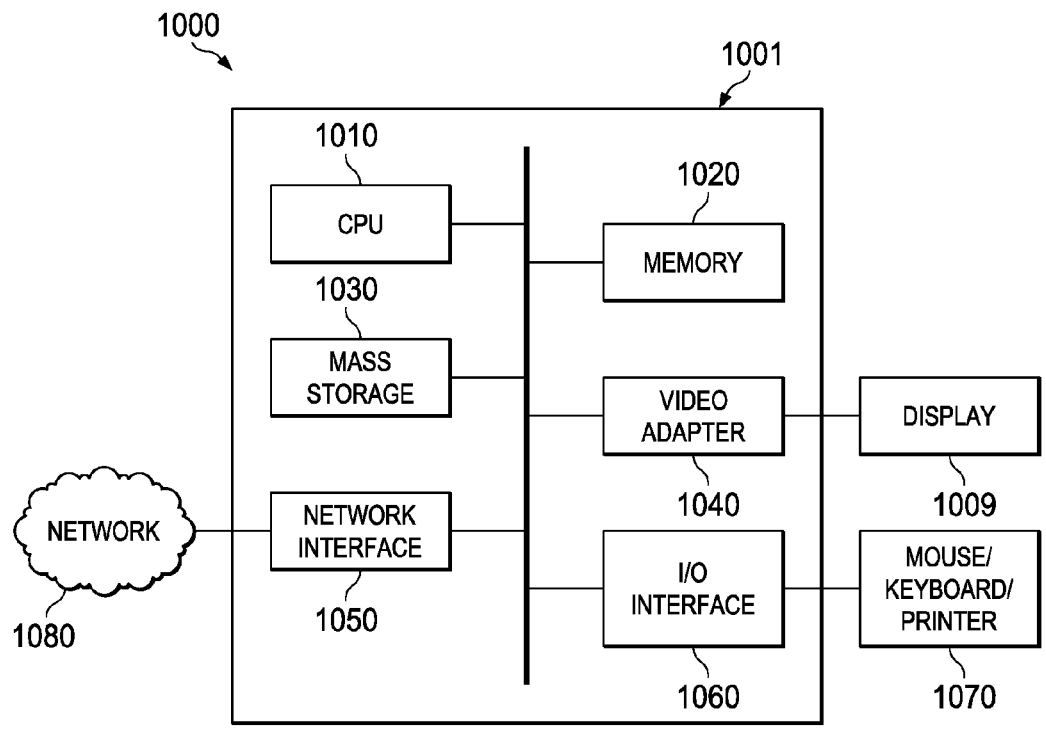
FIG. 10 is a diagram of a processing system that can be used to implement various embodiments.

FIG. 10 is a block diagram of a processing system 1000 that can be used to implement various embodiments. The processing system 1000 can be part of a BS (e.g., eNB), a WiFi TP, a UE, or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, a memory 1020, a mass storage device 1030, a video adapter 1040, and an I/O interface 1060 connected to a bus. The bus may be one or more of any type of several bus architectures including a memory bus or memory controller, a peripheral bus, a video bus, or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the I/O interface 1060 provide interfaces to couple external input and output devices to the processing unit. As illustrated, examples of input and output devices include a display 1090 coupled to the video adapter 1040 and any combination of mouse/keyboard/printer 1070 coupled to the I/O interface 1060. Other devices may be coupled to the processing unit 1001, and additional or fewer interface cards may be utilized. For example, a serial interface card (not shown) may be used to provide a serial interface for a printer.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network entity for configuring transmission in a multiple-input and multiple-output (MIMO) system, the method comprising:
    translating, into a frequency domain penalty, a time domain penalty for a time domain signal to be transmitted by a plurality of selected antennas of the network entity, the time domain penalty determined to add cost to one or more portions of the time domain signal that are projected on one or more of the selected antennas with higher peak-to-average power ratio (PAPR) than remaining portions of the time domain signal; and
    obtaining a penalized frequency domain signal to be transmitted by a plurality of antennas in accordance with the frequency domain penalty, wherein obtaining the penalized frequency domain signal includes selecting parameters for the frequency domain penalty that reduce a PAPR of the penalized frequency domain signal beyond a threshold.

2. The method of claim 1, wherein the penalized frequency domain signal is transmitted with orthogonal frequency-division multiplexing (OFDM) on multiple carriers.

3. The method of claim 1, wherein the network entity is one of a radio access network (RAN) or a user equipment (UE).

4. The method of claim 1, wherein the plurality of antennas for transmitting the penalized frequency domain signal are the selected antennas or include one or more antennas other than the selected antennas.

5. A method performed by a network entity for configuring transmission in a multiple-input and multiple-output (MIMO) system, the method comprising:
    translating, into a frequency domain penalty, a time domain penalty for a time domain signal to be transmitted by a plurality of selected antennas of the network entity, the time domain penalty determined to add cost to one or more portions of the time domain signal that are projected on one or more of the selected antennas with higher peak-to-average power ratio (PAPR) than remaining portions of the time domain signal; and
    obtaining a penalized frequency domain signal to be transmitted by a plurality of antennas in accordance with the frequency domain penalty, wherein obtaining the penalized frequency domain signal to be transmitted by the plurality of antennas in accordance with the frequency domain penalty offloads the one or more portions of the time domain signal with higher PAPR to spatial dimensions of transmission initially unused in the selected antennas.

6. A network component supporting transmission in a multiple-input and multiple-output (MIMO) system, the network component comprising:
    at least one processor; and
    a non-transitory computer readable storage medium storing programming for execution by the at least one processor, the programming including instructions to:
        translate, into a frequency domain penalty, a time domain penalty for a time domain signal to be transmitted by a plurality of selected antennas of the network component, the time domain penalty determined to add cost to one or more portions of the time domain signal projected on one or more of the selected antennas with higher peak-to-average power ratio (PAPR) than remaining portions of the time domain signal; and
        obtain a penalized frequency domain signal to be transmitted by a plurality of antennas in accordance with the frequency domain penalty, wherein the instructions to obtain the penalized frequency domain signal include instructions to select parameters for the frequency domain penalty that reduce a PAPR of the penalized frequency domain signal beyond a threshold.

7. The network component of claim 6, wherein the plurality of antennas for transmitting the penalized frequency domain signal are the selected antennas or include one or more antennas other than the selected antennas.

8. The network component of claim 6, wherein the instructions to obtain the penalized frequency domain signal to be transmitted by the plurality of antennas in accordance with the frequency domain penalty include instructions to offload the one or more portions of the time domain signal with higher PAPR to spatial dimensions of transmission initially unused in the selected antennas.

9. The network component of claim 6, wherein the penalized frequency domain signal is transmitted with orthogonal frequency-division multiplexing (OFDM) on multiple carriers.

10. The network component of claim 6, wherein the network component is one of a radio access network (RAN) or a user equipment (UE).

11. A method for transmitting a signal by a transmitter having a plurality of antennas, comprising:
    determining a first signal for the plurality of antennas;
    clipping the first signal to a predetermined maximum amplitude to generate a second signal;
    determining a distortion in a second received signal corresponding to the second signal, based on a first received signal corresponding to the first signal;
    determining a compensation signal corresponding to the distortion;

transmitting a third signal being a sum of the second signal and the compensation signal;
determining a time domain penalty for the first signal, the time domain penalty determined to add cost to one or more portions of the first signal that are projected on one or more selected antennas with higher peak-to-average power ratio (PAPR) than remaining portions of the first signal;
translating the time domain penalty into a frequency domain penalty based on the compensation signal; and
obtaining a penalized frequency domain signal to be transmitted by the plurality of antennas in accordance with the frequency domain penalty, wherein the penalized frequency domain signal is determined with an optimization constant.

12. The method of claim 11, wherein the plurality of antennas for transmitting the penalized frequency domain signal are the selected antennas or include one or more antennas other than the selected antennas.

13. A method for transmitting a signal by a transmitter having a plurality of antennas, comprising:
determining a first signal for the plurality of antennas;
determining a diagonal matrix as a penalty function, wherein each diagonal entry of the diagonal matrix is derived from a transmit amplitude of the first signal on each of the plurality of antennas;
determining a second signal based on at least the first signal and the penalty function; and
transmitting the second signal using the plurality of antennas.

14. The method of claim 13, wherein the second signal has a lower peak-to-average power ratio (PAPR) than the first signal.

15. The method of claim 13, wherein the diagonal entries of the diagonal matrix are powers of the transmit amplitudes of the individual antennas.

16. The method of claim 13, wherein determining a first signal for the plurality of antennas comprises performing zero forcing (ZF) based on a channel matrix.

17. The method of claim 13, further comprising amplifying the second signal prior to transmitting the second signal.

18. The method of claim 13, wherein the second signal is a single carrier signal.

19. The method of claim 13, wherein:
the first signal is a first frequency domain signal;
the penalty function is a time domain penalty function; and
determining the second signal comprises converting the time domain penalty function to a frequency domain penalty function.

20. The method of claim 19, wherein the second signal is an OFDM signal.

21. A wireless device comprising:
a plurality of antennas;
at least one processor; and
a non-transitory computer-readable storage medium storing programming for execution by the at least one processor, the programming including instructions to:
determine a first signal for the plurality of antennas;
determine a diagonal matrix as a penalty function, wherein each diagonal entry of the diagonal matrix is derived from a transmit amplitude of the first signal on each of the plurality of antennas;
determine a second signal based on at least the first signal and the penalty function; and
transmit the second signal using the plurality of antennas.

22. The wireless device of claim 21, wherein:
the first signal is a first frequency domain signal;
the penalty function is a time domain penalty function; and
the instructions to determine the second signal comprise instructions to convert the time domain penalty function to a frequency domain penalty function.

23. The wireless device of claim 22, wherein the second signal is an OFDM signal.

24. The wireless device of claim 21, wherein the second signal has a lower peak-to-average power ratio (PAPR) than the first signal.

25. The wireless device of claim 21, wherein the diagonal entries of the diagonal matrix are powers of the transmit amplitudes of the individual antennas.

26. The wireless device of claim 21, wherein the instructions to determine the first signal for the plurality of antennas comprise instructions to performing zero forcing (ZF) based on a channel matrix.

27. The wireless device of claim 21, wherein the programming includes further instructions to amplify the second signal prior to transmitting the second signal.

28. The wireless device of claim 21, wherein the second signal is a single carrier signal.

29. A network component comprising:
a plurality of antennas;
at least one processor; and
a non-transitory computer readable storage medium storing programming for execution by the at least one processor, the programming including instructions to:
determine a first transmitting signal for the plurality of antennas;
clip the first transmitting signal to a predetermined maximum amplitude to generate a second transmitting signal;
determine a distortion in a second received signal based on a first received signal, wherein the first received signal is derived from the first transmitting signal and a fading channel matrix, and the second received signal is derived from the second transmitting signal and the fading channel matrix;
determine a compensation signal corresponding to the distortion; and
transmit a third transmitting signal being a sum of the second transmitting signal and the compensation signal.

30. The network component of claim 29, wherein the programming includes further instructions to transmit the third transmitting signal using the plurality of antennas.

31. The network component of claim 29, wherein the network component is one of a radio access network (RAN) or a user equipment (UE).

32. A network component comprising:
a plurality of antennas;
at least one processor; and
a non-transitory computer readable storage medium storing programming for execution by the at least one processor, the programming including instructions to:
determine a first signal for the plurality of antennas;
clip the first signal to a predetermined maximum amplitude to generate a second signal;
determine a distortion in a second received signal corresponding to the second signal, based on a first received signal corresponding to the first signal;

determine a compensation signal corresponding to the distortion;

transmit a third signal being a sum of the second signal and the compensation signal;

determine a time domain penalty for the first signal, the time domain penalty determined to add cost to one or more portions of the first signal that are projected on one or more selected antennas with a higher peak-to-average power ratio (PAPR) than remaining portions of the first signal;

translate the time domain penalty into a frequency domain penalty based on the compensation signal; and obtain a penalized frequency domain signal to be transmitted by the plurality of antennas in accordance with the frequency domain penalty, wherein the penalized frequency domain signal is determined with an optimization constant.

33. The network component of claim 32, wherein the plurality of antennas for transmitting the penalized frequency domain signal are the selected antennas or include one or more antennas other than the selected antennas.

34. A method for transmitting a signal by a transmitter having a plurality of antennas, comprising:

determining a first transmitting signal for the plurality of antennas;

clipping the first transmitting signal to a predetermined maximum amplitude to generate a second transmitting signal;

determining a distortion in a second received signal based on a first received signal, wherein the first received signal is derived from the first transmitting signal and a fading channel matrix, and the second received signal is derived from the second transmitting signal and the fading channel matrix;

determining a compensation signal corresponding to the distortion; and transmitting a third transmitting signal being a sum of the second transmitting signal and the compensation signal.

35. The method of claim 34 further comprising transmitting the third transmitting signal using the plurality of antennas.

36. The method of claim 34, wherein the transmitter is one of a radio access network (RAN) or a user equipment (UE).

* * * * *